United States Patent [19]
Ueki

[11] Patent Number: 5,882,279
[45] Date of Patent: Mar. 16, 1999

[54] LOCK-UP CONTROL APPARATUS AND METHOD FOR TORQUE CONVERTER OF AUTOMATIC POWER TRANSMISSION

[75] Inventor: Akihiro Ueki, Isehara, Japan

[73] Assignee: Nissan Motor Co., Ltd., Yokohama, Japan

[21] Appl. No.: 892,526

[22] Filed: Jul. 14, 1997

[30] Foreign Application Priority Data

Jul. 19, 1996 [JP] Japan .................................. 8-190817

[51] Int. Cl.⁶ ................................................ F16H 61/14
[52] U.S. Cl. .......................................... 477/168; 477/174
[58] Field of Search .................................. 477/168, 174; 701/67

Primary Examiner—Dirk Wright
Attorney, Agent, or Firm—Foley & Lardner

[57] ABSTRACT

A lock-up control apparatus and method for a torque converter of an automatic power transmission associated with a vehicular internal combustion engine driven in a plurality of engine driving modes, such as a lean burn mode. A lock-up region of a map for the torque converter is modified toward a higher vehicle speed when the engine operates in one of the driving modes such that an engine output torque value becomes large under the same engine load conditions as those when the engine is driven in any one of the other driving modes in which the engine output torque is small. The lock-up region is extended up to a higher engine load region when the engine operates in one of the driving modes such that the engine output torque is small under the same load condition.

13 Claims, 5 Drawing Sheets

| | | LEAN BURN STATE SIGNAL (LBS) | |
|---|---|---|---|
| | | INACTIVE-LEAN BURN INHIBIT | ACTIVE-LEAN BURN |
| OIL TEMPERATURE (T) | HIGH | SELECTION OF LOCK-UP REGION FOR LEAN BURN INHIBIT | SELECTION OF LOCK-UP REGION MAP FOR A LEAN BURN |
| | TH | | |
| | TL | DEAD ZONE | |
| | LOW | SELECTION OF LOCK-UP REGION FOR A LEAN BURN | |

LOCK-UP CONTROL APPARATUS AND METHOD FOR TORQUE CONVERTER OF AUTOMATIC POWER TRANSMISSION

BACKGROUND OF THE INVENTION

The present invention relates to an automatic power transmission for an automotive vehicle. The present invention particularly relates to lock-up control apparatus and method for a torque converter of the vehicular automatic power transmission associated with an internal combustion engine which is driven in a plurality of driving modes. The associated engine is such a lean burn engine or internal-cylinder direct injection gasoline engine that the different driving modes make different engine output torque values under exactly the same engine load applications.

A torque converter is installed in an automatic power transmission in order to provide a driving torque augmentation function and a driving torque variation absorption (compensation) function for a drive train in the automatic power transmission.

Since, however, a slip occurs between input and output elements (pump impeller and turbine liner) of the torque converter, a power transmission efficiency becomes unavoidably worsened.

Hence, many of the torque converters, in these days, adopt a lock-up type such that, when the vehicle is transferred into such a driving condition that neither the torque augmentation function nor torque variation absorption function is required, a converter state in which no slip limitation occurs between the input and output elements can be switched to a lock-up state in which a mechanical (direct) coupling between the input and output elements occurs.

It is a general practice that, in a lock-up control method for such a lock-up type torque converter as described above, a controller determines whether the torque converter should fall in the lock-up state or not according to the engine load state and a vehicle speed, including the case where the engine located at a prior stage of the torque converter is such the lean burn engine or internal-cylinder direct injection gasoline engine as is driven in the plurality of the driving modes such that the different driving modes make the different engine torque values under the same engine load conditions.

A Japanese Patent Application First Publication (unexamined) No. Showa 59-150942 published on Aug. 29, 1984 exemplifies a previously proposed control apparatus for an air-fuel mixture ratio of a lean burn engine associated with the lock-up type torque converter.

In the above-identified Japanese Patent Application First Publication, the air-fuel mixture ratio of the engine becomes lean, i.e., a lean burn state when the lock-up state of the torque converter occurs.

However, in the lock-up control technique for the torque converter associated with the lean burn engine described in the above-identified Japanese Patent Application First Publication, a lock-up region to render the torque converter in the lock-up state which is determined according to the engine load and the vehicle speed is left unchanged in both two driving modes such that in a lean burn state the engine output torque value becomes small and in a lean burn inhibit state wherein the air-fuel mixture ratio is maintained at a stoichiometric air-fuel mixture ratio the engine output torque value becomes large, under the same engine load conditions.

That is to say, since the lock-up region for the torque converter is the same in the case of the lean burn state of the engine and in the case of the lean burn inhibit state of the engine, the torque converter is locked up in such a low fuel consumption mode that the engine output torque is relatively low.

On the other hand, since it is an usual practice in the lean burn engine that when an engine coolant temperature is relatively low or relatively high, the lean burn state is inhibited. During such a lean burn inhibit state as described above, the engine output torque value is large as compared with the case of the lean burn state.

Hence, since an input torque imposed on the torque converter is large during the lean burn inhibit state of the engine, a pump drainage of a lock-up clutch piston used to directly couple between the input and output elements of the torque converter becomes lack so that a clutching force thereof becomes deficient, thus a, so-called, judder being developed.

SUMMARY OF THE INVENTION

It is therefore an object of the present invention to provide improved lock-up control apparatus and method for a torque converter of a vehicular automatic power transmission associated with an internal combustion engine driven in a plurality of driving modes such that the different driving modes make engine output torque values different under mutually the same load conditions.

The above-described object can be achieved by providing a lock-up control apparatus for a torque converter of a vehicular automatic power transmission associated with a prime mover which is driven in a plurality of driving modes such that output torque values thereof are different depending upon the driving modes under the same load conditions, the torque converter having a lock-up device which is so constructed and located in the torque converter as to operatively lock up input and output elements of the torque converter to make a direct coupling therebetween, the lock-up control apparatus comprising: a driving condition detector which is so constructed and located in the prime mover as to detect a driving condition of the prime mover, the driving condition detector having a load sensor which is so constructed and located in the prime mover as to detect a load imposed on the prime mover; a vehicle speed sensor which is so constructed and located in the vehicle as to detect a vehicle speed; a first controller which is so constructed and connected to the prime mover so as to provide which one of the plurality of driving modes the prime mover is to be driven for the prime mover on the basis of the detected driving condition of the prime mover; and a second controller having a map defining a lock-up region with respect to the load and vehicle speed and which is so constructed and connected to the first controller and the automatic power transmission as to determine in which one of the plurality of the driving modes the prime mover is currently driven on the basis of an information that in which one of the plurality of the driving modes the prime mover is currently driven from the first controller and so as to operate the lock-up device to make the direct coupling between the input and output elements of the torque converter according to whether the detected load and the detected vehicle speed fall in the lock-up region of the map, the second controller extending the lock-up region of the map up to a higher load region when determining that the prime mover is currently driven in one of the plurality of driving modes in which the output torque of the prime mover is smaller than that in the case of the prime mover being driven in any one of the other driving modes.

The above-described object can also be achieved by a lock-up control apparatus for a torque converter of a vehicular automatic power transmission associated with a prime mover which is driven in a plurality of driving modes such that output torque values thereof are different depending upon the driving modes under the same load conditions, the torque converter having a lock-up device which is so constructed and located in the torque converter as to operatively lock up input and output elements of the torque converter to make a direct coupling therebetween, the lock-up control apparatus comprising: a driving condition detector which is so constructed and located in the prime mover as to detect a driving condition of the prime mover, the driving condition detector having a load sensor which is so constructed and located in the prime mover as to detect a load imposed on the prime mover; a vehicle speed sensor which is so constructed and located in the vehicle as to detect a vehicle speed; a first controller which is so constructed and connected to the prime mover so as to provide which one of the plurality of driving modes the prime mover is to be driven for the prime mover on the basis of the driving condition of the prime mover; and a second controller having a map defining a lock-up region with respect to the load and vehicle speed and which is so constructed and connected to the first controller and the automatic power transmission as to determine in which one of the plurality of the driving modes the prime mover is currently driven on the basis of an information that in which one of the plurality of the driving modes the prime mover is currently driven from the first controller and so as to operate the lock-up device to make the direct coupling between the input and output elements of the torque converter according to whether the detected load and the detected vehicle speed fall in the lock-up region of the map, the second controller modifying the lock-up region of the map to be moved toward a higher vehicle speed side when determining that the engine is driven in one of the driving modes in which the output torque value of the prime mover is higher than that in the case of the prime mover being driven in any one of the other driving modes.

The above-described object can also be achieved by providing a lock-up control method for a torque converter of a vehicular automatic power transmission associated with a prime mover which is driven in a plurality of driving modes such that output torque values thereof are different depending upon the driving modes under the same load conditions, the torque converter having a lock-up device which is so constructed and located in the torque converter as to operatively lock up input and output elements of the torque converter to make a direct coupling therebetween, the lock-up control method comprising the steps of: a) detecting a driving condition of the prime mover including a load imposed on the prime mover; b) detecting a vehicle speed; c) providing which one of the plurality of driving modes the prime mover is to be driven for the prime mover on the basis of the driving condition of the prime mover detected at the step a); d) determining in which one of the plurality of the driving modes the prime mover is currently driven on the basis of an information that in which one of the plurality of the driving modes the prime mover is currently driven at the step c); e) extending a lock-up region of a map up to a higher load region when determining that the prime mover is currently driven in one of the plurality of driving modes in which the output torque of the prime mover is smaller than that in the case of the prime mover being driven in any one of the other driving modes; f) modifying the lock-up region of the map to be moved toward a higher vehicle speed side when determining that the engine is driven in another of the driving modes in which the output torque value of the prime mover is higher than that in the case of the prime mover being driven in any one of the other driving modes; g) determining whether the detected load and vehicle speed fall in the lock-up region of the map; and h) operating the lock-up device to make the direct coupling between the input and output elements of the torque converter when the detected load and the detected vehicle speed fall in the lock-up region of the map.

BEST MODE FOR CARRYING OUT THE INVENTION

Reference will hereinafter be made to the drawings in order to facilitate a better understanding of the present invention.

Figure 1A:
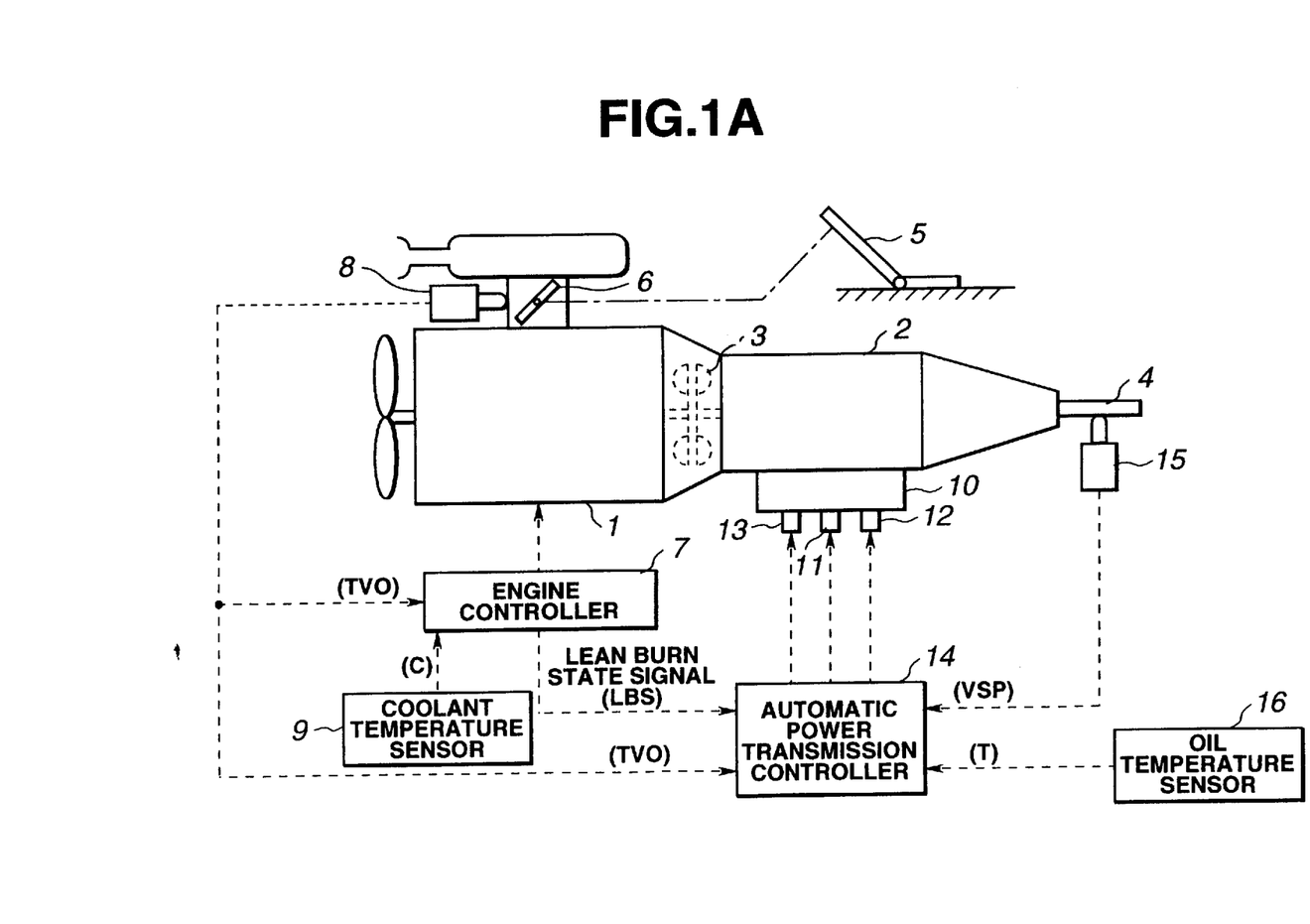
FIG. 1A is an overall circuit block diagram of a lock-up control apparatus of a torque converter of an automatic power transmission associated with a vehicular internal combustion engine in a preferred embodiment according to the present invention.

FIG. 1A shows a preferred embodiment of a lock-up control apparatus for a torque converter of an automatic power transmission associated with an internal combustion engine driven in a plurality of driving modes.

Figure 1B:
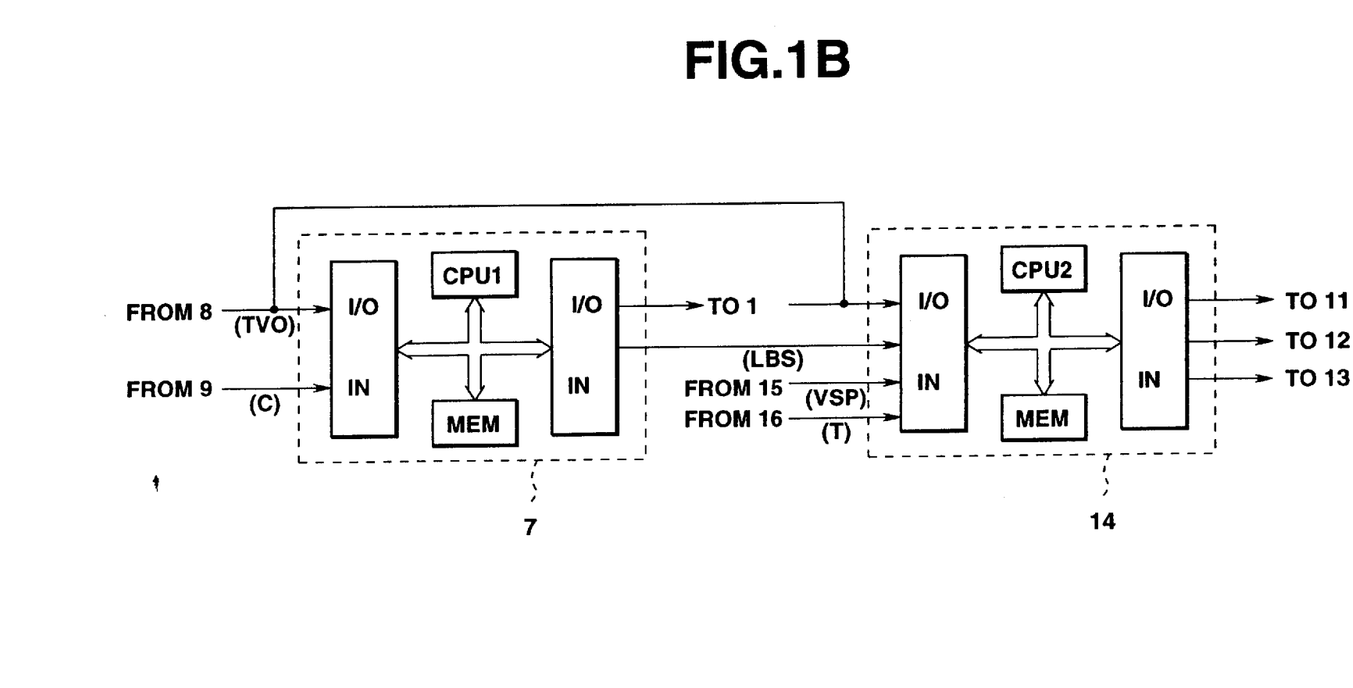
FIG. 1B is a circuit block diagram of an engine controller and associated automatic power transmission controller shown in FIG. 1A.

FIGS. 1B shows a connection diagram of an automatic transmission controller associated with an engine controller shown in FIG. 1A.

In FIG. 1A, an internal combustion engine is a, so-called, lean burn engine 1 and an automatic power transmission 2 is associated with the lean burn engine 1 in the preferred embodiment.

The automatic power transmission 2 receives a revolving power from the lean burn engine 1 and transmits the input revolving power to an output axle 4 thereof, with a gear shift change at a selected gear ratio.

The lean burn engine 1 is provided with a throttle valve 6 whose opening angle is augmented according to a depression angle of a gas pedal (accelerator pedal) 5 by a vehicle driver. The lean burn engine 1 sucks an intake air according to the opening angle of the throttle valve 6 and the engine revolution speed. The engine 1 is provided with a fuel injection valve and ignition device for each engine cylinder which is controlled by the engine controller 7. The engine controller 7 receives various types of engine parameters such as a signal from a throttle opening angle sensor 8 detecting the opening angle TVO of the throttle valve 6, a signal from an engine coolant temperature sensor 9 detecting a temperature C of an engine coolant, a signal indicating an intake air quantity, and so forth.

The engine controller 7 determines whether the engine 1 should be driven in a lean burn driving mode such that an importance is placed on a reduction of a fuel consumption rather than an increase in an engine output torque or in a lean burn inhibit mode such that an air fuel mixture ration is feed back controlled to provide a stoichiometric air-fuel mixture ratio. The engine controller 7 controls a valve opening duration and valve opening timing of each fuel injection valve and simultaneously controls an ignition timing of an ignition plug for each cylinder so that a desired fuel quantity is supplied to the engine 1.

It is noted that the lean burn driving mode is forcefully switched to the lean burn inhibit mode when the engine coolant temperature C is above an upper threshold value or is below a lower threshold value.

Hence, in the lean burn engine 1, even if the same throttle valve opening angle TVO is detected, i.e., even under the same engine load conditions, the engine output torque values are different depending on the engine driving modes, i.e., whether the engine driving mode currently falls in the lean burn mode or in the lean burn inhibit mode.

In details, during the lean burn mode, the engine output torque is reduced but the fuel consumption is improved. On the contrary, during the lean burn inhibit mode, the fuel consumption is rather sacrificed but the engine output torque is augmented so as to assure a running performance of the vehicle.

On the other hand, in the automatic power transmission 2, a combination of On and OFF states of a plurality of shift solenoids within a control valve 10 determine a selected gear speed range from a first gear speed range to a fourth gear speed range. The torque converter 3 falls in one of two states: a lock-up state in which a lock-up clutch piston thereof is operated to perform a mechanical coupling between input and output elements of the torque converter 3; a converter state in which the lock-up state is released according to an On or OFF state of a lock-up solenoid 13 within the control valve 10. The lock-up solenoid 13 serves to maximize a clutching force of the lock-up clutch piston so as to lock up the torque converter 3' when it is turned to ON and serves to nullify the clutching force of the lock-up clutch piston so as to render the torque converter 3 the converter state when it is turned to OFF.

The automatic power transmission controller 14 controls the ON or OFF state of the shift solenoids 11 and 12 and ON or OFF of the lock-up solenoid.

The automatic power transmission controller 14 receives the signal indicating the opening angle (TVO) of the throttle valve from the throttle valve opening angle sensor 8, a signal indicating a vehicle speed (VSP) from a vehicle speed sensor 15, a signal indicating a detected working oil temperature T of the automatic power transmission 2 from an oil temperature sensor 16, and a signal (LBS) indicating that the engine 1 falls in the lean burn driving mode from the engine controller 7.

The automatic power transmission controller 14 executes a gear shift control program (not shown) on the basis of the received signals described above to perform the gear shift control over the automatic power transmission via turning to ON or OFF of the shift solenoids 11 and 12. In addition, the automatic power transmission controller 14 executes a lock-up control program shown in FIG. 2 to perform a lock-up control for the torque converter 3 via the turning to ON or OFF of the lock-up solenoid 13.

The automatic power transmission controller 14 calculates a suitable gear speed range on the basis of a scheduled gear speed range map from the signal indicating the opening angle TVO of the throttle valve opening angle sensor 8 and from the vehicle speed VSP detected by the vehicle speed sensor 15 and does not modify the ON or OFF states of the shift solenoids 11 and 12 when the suitable gear shift range is coincident with the presently selected gear shift range. It is not coincident with the presently selected gear range, the ON or OFF state of the shift solenoids 11 and 12 is switched to achieve the suitable gear shift range change. Thus, the change of the gear shift to the suitable gear shift range can be carried out.

As shown in FIG. 1B, the engine controller 7 includes a microcomputer having a CPU (Central Processing Unit) 1, a memory MEM (of a ROM (Read Only Memory) and a RAM (Random Access Memory), an Input/Output interface, and a common bus.

The automatic power transmission controller 14 includes the microcomputer having a CPU (Central Processing Unit) 2, the memory MEM, the I/O interface (IN), and the common bus.

Figure 2:
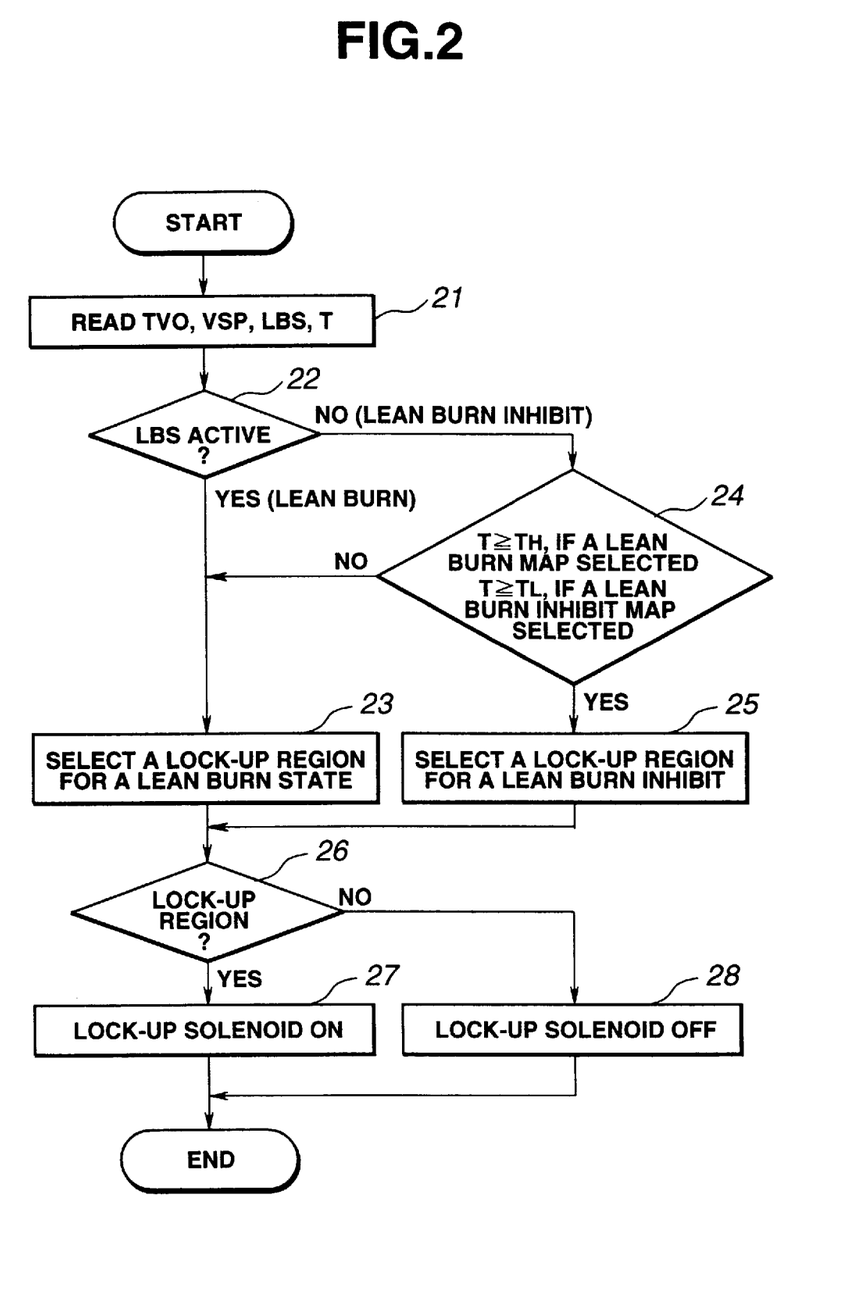
FIG. 2 is an operational flowchart executed by the automatic power transmission controller shown in FIGS. 1A and 1B.

Referring to FIG. 2, the controller 14, i.e., the CPU 2 reads the opening angle (TVO) of the throttle valve, the vehicle speed (VSP), the automatic power transmission working oil temperature T, and lean burn state signal (LBS).

At the next step 22, the CPU 2 determines whether the lean burn signal (LBS) is present or absent (active or inactive) so as to determine whether the engine 1 falls in the lean burn driving mode or in the lean burn inhibit driving mode even under the same driving modes.

Figure 3:
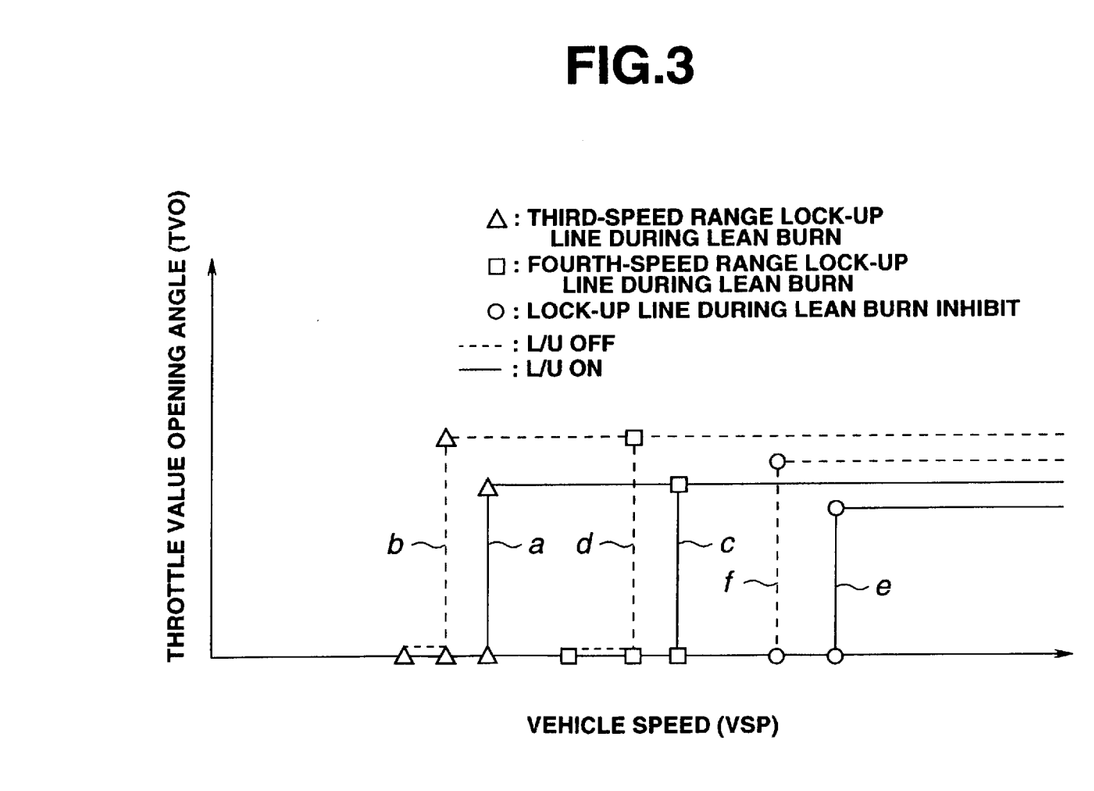
FIG. 3 is a line diagram of vehicle lock-up (boundary) line in a lock-up region map stored in the automatic power transmission controller shown in FIGS. 1A and 1B.
Figure 4:
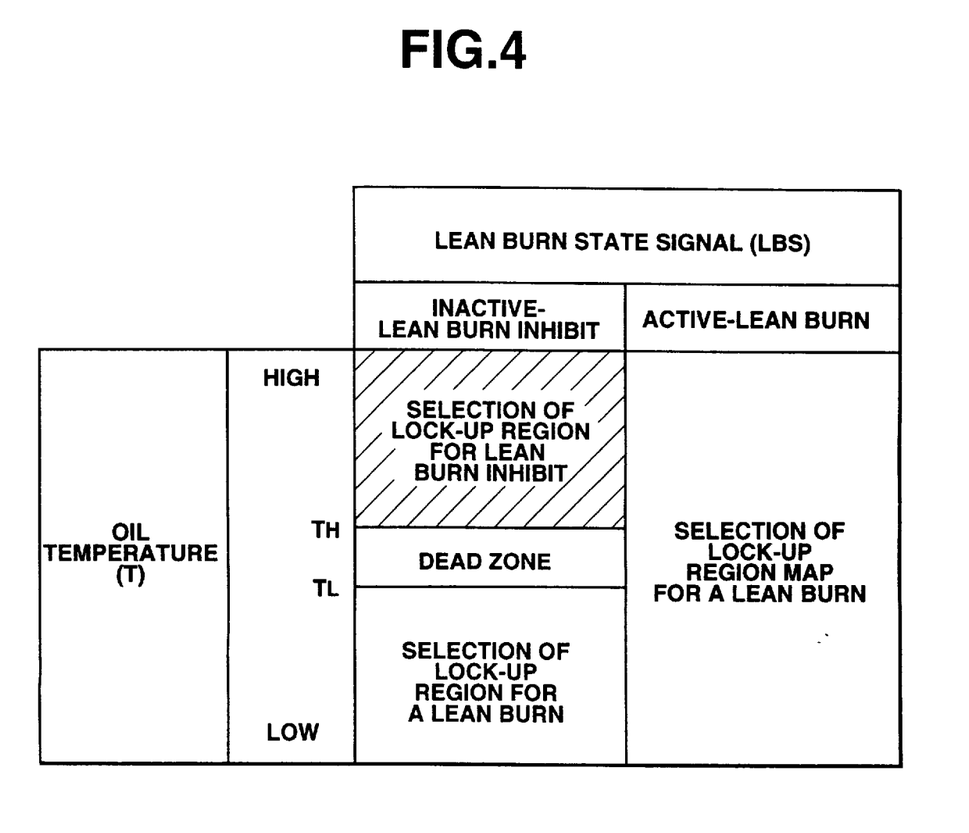
FIG. 4 is another map defining a lock-up region stored in the automatic power transmission controller shown in FIGS. 1A and 1B.

If the engine 1 falls in the lean burn driving mode (YES) at the step 22, the routine goes to a step 23 in which the CPU 2 selects a lock-up region map for the lean burn driving mode indicated by a, b, c, and d in FIG. 3 on the basis of FIG. 4.

If the engine 1 falls in the lean burn inhibit mode (NO) at the step 23, the routine goes to a step 24.

At a step 24, the CPU 2 determines whether the engine 1 falls in a lock-up region map selection region for the lean burn inhibit driving mode shown in FIG. 4 according to the following procedure.

In details, at the step 24, the CPU 2 determines whether the working oil temperature T is equal to or above the upper threshold value $T_H$ shown in FIG. 4 when the lock-up region map for the lean burn driving mode is selected and, in addition, determines whether the working oil temperature T is equal to or below the lower threshold value $T_L$ shown in FIG. 4 when the lock-up region map for the lean burn inhibit driving mode is selected (the lock-up region map for the lean burn inhibit driving mode indicated by e and f of FIG. 3).

At the step 24, in a case where the CPU 2 determines that the engine 1 does not fall in the lock-up region selection driving condition for the lean burn inhibit driving mode as shown in FIG. 4.

Then, at the step 24, the CPU 2 determines that the engine 1 falls in the lock-up region map selection region for the lean burn inhibit driving mode shown in FIG. 4. At the step 25, the CPU 2 selects the lock-up region map for the lean burn inhibit driving mode indicated by e and f of FIG. 3.

The lock-up region maps a through d for the lean burn driving mode shown in FIG. 3 and those e and f for the lean burn inhibit driving mode shown in FIG. 3 will be described in details below.

In the embodiment, the torque converter 3 is locked up during either the third or fourth speed range (the fourth speed range is an over drive (OD) gear shift range) when the engine 1 falls in the lean burn driving mode. In addition, when the engine 1 is inhibited from being driven in the lean burn driving mode so that the air-fuel mixture ratio is feedback controlled to approach to the stoichiometric air-fuel mixture ratio (during the lean burn inhibit driving mode), the selection of the fourth speed range (over drive (OD) gear shift range) is inhibited in the automatic power transmission and, during the lean burn inhibit driving mode, the lock-up region for the third speed range is only present.

It is noted that a in FIG. 3 denotes a third-speed range lock-up line during the lean burn driving mode, b in FIG. 3 denotes a third-speed range lock-up release line during the lean burn driving mode, c in FIG. 3 denotes a fourth-speed range lock-up line during the lean burn driving mode, e in FIG. 3 denotes a third-speed lock-up line during the lean burn inhibit driving mode, and f in FIG. 3 denotes a lock-up release line during the lean burn inhibit mode. Then, the torque converter 3 should be locked up when the engine load is below each lock-up line (the opening angle (TVO) of the throttle valve 6 is narrower so as to be below each lock-up line) and when the vehicle speed is higher than that in each lock-up line.

In the embodiment, when the lock-up lines a and c for the lean burn driving mode and the lock-up release lines b and c for the lean burn driving mode are compared with the lock-up line e for the lean burn inhibit driving mode and the lock-up release line f for the lean burn inhibit driving mode, the lock-up region for the lean burndriving mode used in the lean burn driving mode such that the engine torque is relatively low is extended in a wider opening angle direction of the throttle valve 6 and in a lower vehicle speed direction.

In other words, for the difference in the lock-up region related to the vehicle speed, the lock-up region for the lean burn inhibit driving mode is shortened in a higher vehicle speed direction than that for the lean burn driving mode.

The reason that the lock-up region for the lean burn driving mode is varied in the wider opening angle direction (higher engine load condition side) of the throttle valve 6 than that for the lean burn inhibit driving mode will be described below.

In details, the engine output torque in the lean burn driving mode is small as compared with that in the lean burn inhibit driving mode. Hence, if the lock-up engine is the same as that during the lean burn state of the engine 1 and that during the lean burn state of the engine 1 and that during the lean burn inhibit state of the engine, the torque converter 3 is locked up in the fuel consumption mode such that the engine output torque is reduced. Consequently, an ill effect on a vehicular driveability may not only be given but also it may become difficult for the vehicle to run. Therefore, the lock-up region is varied.

In addition, the reason that the lock-up region for the lean burn inhibit driving mode is shortened in a higher vehicle speed direction than the lock-up region for the lean burn driving mode will be described below.

Since the engine output torque in the lean burn driving mode becomes large as compared with that during the lean burn driving mode, the input torque applied to the torque converter 3 becomes large so that the lock-up clutch piston effective to directly couple the input and output elements of the torque converter 3 slips due to a lack in a pump drainage especially under a low vehicle speed so as to give a different capacity of the clutching force. In other words, a, so-called, judder occurs.

Under a low vehicle speed, to solve the above-described problem, the lock-up of the torque converter 3 is not carried out.

At the next step 26 of FIG. 2, the CPU 2 determines whether the torque converter 3 should be locked up according to the opening angle TVO of the throttle valve 6 and the vehicle speed VSP on the basis of the selected lock-up region map at either the step 23 or step 25.

If the CPU 2 determines that the torque converter 3 should be locked up according to the opening angle TVO of the throttle valve 6 and vehicle speed VSP (Yes) at the step 26, the routine goes to a step 27. If the CPU 2 does not determine that the torque converter 3 should be locked up (No) at the step 26, the routine goes to a step 28.

At the step 27, the CPU 2 outputs a command to turn the lock-up solenoid 13 to ON so that the torque converter 3 is locked up. At the step 28, the CPU 2 outputs a command to turn the lock-up solenoid 13 to OFF.

Consequently, the controller 14 executes the lock-up control shown in FIG. 3 depending on whether the engine 1 falls in the lean burn driving mode or in the lean burn inhibit driving mode.

In the preferred embodiment during the engine 1 being driven in the lean burn driving mode, as described with reference to FIG. 3, the lock-up region can be extended up to the wider opening angle range (higher engine load condition) of the throttle valve 6.

In details, if the lock-up region during the lean burn driving mode were the same as that during the lean burn inhibit driving mode, the torque converter 3 would be locked up in the fuel consumption (reduction) mode such that the engine output torque values gives small, thus the ill effect being given to the vehicle driveability and the running difficulty, in worst case, being fallen.

However, since the lock-up region in the case of the lean burn driving mode can be extended up to the higher engine load condition than that in the lean burn inhibit driving mode, the torque converter is not locked up (not in the lock-up state) in the fuel consumption (reduction) mode, thus the above-described problem being eliminated.

In addition, in the preferred embodiment, during the engine 1 driven in the lean burn inhibit mode such that the engine output torque value becomes larger, the lock-up region is modified toward the higher vehicle speed side.

In details, since the engine output torque during the lean burn inhibit driving mode becomes larger than that during the lean burn driving mode, the lock-up clutch piston which operatively causes the input and output elements of the torque converter 3 to be directly coupled slips due to the deficient clutching force caused by the pump drainage (discharge quantity) especially under the relatively low vehicle speed.

Consequently, the, so-called, judder occurs.

However, in the preferred embodiment, since the lock-up region during the engine 1 driven in the lean burn inhibit mode is modified to the higher vehicle speed side, the torque converter 3 is not locked up in a vehicle speed range such that the lock-up clutch piston becomes lack in the clutching force and the problem of occurrence of the judder can be avoided.

It is noted that in a case where the lean burn engine 1 shown in FIG. 1 is the, so-called, internal-cylinder fuel directly injected gasoline engine (the gasoline is directly injected through an intake port into a combustion chamber of each cylinder) which tends to be adopted as the vehicular engine with the improvement in the fuel consumption in mind, a control signal representing the engine output torque, for example, the signal representing the fuel injection quantity derived from the engine controller 7, or so forth is used to determine whether the engine falls in the lean burn driving mode or in the lean burn inhibit driving mode. In the latter case, the lean burn state signal (LBS) shown in FIGS. 1A and 1B is replaced with the signal representing the fuel injection quantity or so forth.

As described above with reference to FIG. 4, the lock-up region map for the lean burn inhibit driving mode is selected during the engine 1 driven in the lean burn inhibit driving mode and only when the working oil temperature T is equal to or above the upper threshold value $T_H$.

In details, a leakage oil quantity from the lock-up clutch piston is increased due to a reduction in a viscosity of the working oil during the high working oil temperature. The lock-up clutch piston tends to become lack in the clutching force and the judder can easily occur.

Hence, since the lock-up region map for the lean burn inhibit driving mode is selected only when the working oil temperature T is as high as equal to or above the upper threshold value $T_H$, the limitation of the lock-up for the torque converter according to the vehicle speed for the lean burn inhibit driving mode is carried out only when such a situation that the lock-up clutch piston really becomes lack in the clutching force even during the same lean burn inhibit driving mode.

Consequently, the limitation on the lock-up state can be avoided as minimum as possible and the effect of the lock-up state of the torque converter on the improvement in the fuel consumption can be maximized.

It is noted that, in the case where the engine associated with the automatic power transmission is the lean burn engine, it is a general practice that when the engine coolant temperature is below the lower threshold value or when it is above the upper threshold value, the lean burn driving is inhibited for the control convenience purpose.

Hence, if the engine coolant temperature is monitored and the monitored engine coolant temperature is above the upper threshold value or below the lower threshold value, the controllers 7 and/or 14 can determine that the engine 1 is currently driven in the lean burn inhibit mode.

In this case, the determination accuracy of the lean burn inhibit driving mode is improved.

Since, in the preferred embodiment, the engine 1 has two modes of the lean burn mode and of the lean burn inhibit mode, the automatic power transmission controller 14 can determine the driving mode according to the presence or absence of the lean burn state signal (LBS). However, the controller 14 can determine in which one of a plurality of the engine driving modes the engine falls according to at least one of a rich state or lean state of the air-fuel mixture ratio, the magnitude of the fuel injection quantity, the magnitude of the fuel injection quantity, the ignition timing for each ignition plug, and an overlap variable of the valve opening timings of both intake and exhaust valves of the engine, in addition to or other than the presence or absence of the lean burn state signal (LBS)

In details, the transmission controller 14 can determine that the engine falls in one of the engine driving modes such that the engine output torque becomes larger as the air-fuel mixture becomes richer under the same opening angle (TVO) conditions of the throttle valve, in the case of the air-fuel mixture ratio.

In the case of the fuel injection quantity, the controller 14 can determine that the engine falls in one of the engine driving modes such that the engine output torque becomes larger as the fuel injection quantity becomes increased under the same opening angle (TVO) conditions of the throttle valve, In the case of the ignition timing, the controller 14 can determine that the engine falls in one of the engine driving modes such that the engine output torque becomes larger as the ignition timing angle becomes advanced under the same opening angle conditions of the throttle valve, In the case of the valve overlap variable on the valve opening timings of both the intake and exhaust valves, the controller can determine that the engine falls in one of the engine driving modes such that the engine output torque becomes larger as the overlap variable of the valve opening timings of both the intake and exhaust valves becomes smaller under the same engine revolution speed conditions.

The lock-up torque converter is exemplified by a U.S. Pat. No. 5,203,835 or U.S. Pat. No. 4,577,737 (, the disclosure of which is herein incorporated by reference).

The air-fuel mixture ratio control apparatus for the lean burn engine is exemplified by a U.S. Pat. No. 5,634,445(, the disclosure of which is herein incorporated by reference).

The structure and valve opening overlap of the intake and exhaust valves of the engine is exemplified by the U.S. Pat. No. 4,759,371 (, the disclosure of which is herein incorporated by reference).

The ignition timing control system is exemplified by a U.S. Pat. No. 5,448,975(, the disclosure of which is herein incorporated by reference).

It is noted that a prime mover corresponds to the internal combustion engine, e.g., shown in FIG. 1A or equivalents thereto.

It is of course that the present invention is applicable to the lock-up control apparatus for the torque converter of the automatic (power) transmission associated with the engine which is capable of being driven in the plurality of driving modes other than the lean-burn engine described in the embodiment.

What is claimed is:

1. A lock-up control apparatus for a torque converter of a vehicular automatic power transmission associated with a prime mover which is driven in a plurality of driving modes such that output torque values thereof are different depending upon the driving modes under the same load conditions, the torque converter having a lock-up device which is so constructed and located in the torque converter as to operatively lock up input and output elements of the torque converter to make a direct coupling therebetween, the lock-up control apparatus comprising:

a driving condition detector which is so constructed and located in the prime mover as to detect a driving condition of the prime mover, the driving condition detector having a load sensor which is so constructed and located in the prime mover as to detect a load imposed on the prime mover;

a vehicle speed sensor which is so constructed and located in the vehicle as to detect a vehicle speed;

a first controller which is so constructed and connected to the prime mover so as to provide which one of the plurality of driving modes the prime mover is to be driven for the prime mover on the basis of the detected driving condition of the prime mover; and a second controller having a map defining a lock-up region with respect to the load and vehicle speed and which is so constructed and connected to the first controller and the automatic power transmission as to determine in which one of the plurality of the driving modes the prime mover is currently driven on the basis of an information that in which one of the plurality of the driving modes the prime mover is currently driven from the first controller and so as to operate the lock-up device to make the direct coupling between the input and output elements of the torque converter according to whether the detected load and the detected vehicle speed fall in the lock-up region of the map, the second controller extending the lock-up region of the map up to a higher load region when determining that the prime mover is currently driven in one of the plurality of driving modes in which the output torque of the prime mover is smaller than that in the case of the prime mover being driven in any one of the other driving modes.

2. A lock-up control apparatus for a torque converter of a vehicular automatic power transmission associated with a prime mover which is driven in a plurality of driving modes such that output torque values thereof are different depending upon the driving modes under the same load conditions as claimed in claim 1, wherein the second controller modifies the lock-up region of the map to be moved toward a higher vehicle speed direction when determining that the prime mover is currently driven in another of the driving modes in which the output torque of the prime mover is larger than that in the case of the prime mover being driven in still any one of the other driving modes.

3. A lock-up control apparatus for a torque converter of a vehicular automatic power transmission associated with a prime mover which is driven in a plurality of driving modes such that output torque values thereof are different depending upon the driving conditions under the same load conditions as claimed in claim 2, wherein the prime mover is an internal combustion engine driven in two driving modes; a lean burn driving mode in which the output torque of the engine is relatively low and a lean burn inhibit driving mode in which the output torque of the engine is higher than that in the case of the engine being driven in the lean burn mode, and wherein the first controller outputs a signal indicating the information that the engine is driven in the lean burn driving mode to the second controller so that the second controller determines that the engine is currently driven in the lean burn driving mode.

4. A lock-up control apparatus for a torque converter of a vehicular automatic power transmission associated with a prime mover which is driven in a plurality of driving modes such that output torque values are different depending upon the driving modes under the same load conditions as claimed in claim 3, wherein the load sensor comprises an opening angle sensor installed in an engine throttle valve for detecting an opening angle of the engine throttle valve and wherein the second controller determines that the engine is driven in the lean burn inhibit driving mode according to a signal indicating the information that the output torque of the engine becomes larger as an air-fuel mixture ratio of the engine becomes richer under the same opening angle of the throttle valve from the first controller.

5. A lock-up control apparatus for a torque converter of a vehicular automatic power transmission associated with a prime mover which is driven in a plurality of driving modes such that output torque values thereof are different depending upon the driving modes under the same load conditions as claimed in claim 2, wherein the prime mover is an internal combustion engine driven in the plurality of driving modes and the load sensor comprises an opening angle sensor installed in an engine throttle valve for detecting an opening angle of an engine throttle valve and wherein the second controller determines that the engine is driven in any one of the driving modes which provides an engine output torque higher than any other driving modes according to a signal indicating that the information that the output torque of the engine becomes larger as a fuel injection quantity supplied to the engine becomes larger under the same opening angle of the throttle valve from the first controller.

6. A lock-up control apparatus for a torque converter of a vehicular automatic power transmission associated with a prime mover which is driven in a plurality of driving modes such that output torque values thereof are different depending upon the driving modes under the same load conditions as claimed in claim 2, wherein the prime mover is an internal combustion engine driven in the plurality of driving modes and the load sensor comprises an opening angle sensor installed in an engine throttle valve for detecting an opening angle of an engine throttle valve and wherein the second controller determines that the engine is driven in any one of the driving modes which provides an engine output torque higher than any other driving modes according to a signal indicating that the information that the output torque of the engine becomes larger as an ignition timing angle for the engine becomes advanced under the same opening angle of the throttle valve from the first controller.

7. A lock-up control apparatus for a torque converter of a vehicular automatic power transmission associated with a prime mover which is driven in a plurality of driving modes such that output torque values thereof are different depending upon the driving modes under the same load conditions as claimed in claim 2, wherein the prime mover is an internal combustion engine driven in the plurality of driving modes and the driving condition sensor comprises an engine revolution speed sensor installed in the engine for detecting an engine revolution speed and wherein the second controller determines that the engine is driven in any one of the driving modes which provides an engine output torque higher than any other driving modes according to a signal indicating that the information that the output torque of the engine becomes larger as a valve opening overlap variable of both of intake and exhaust valves of the engine becomes smaller under the same engine revolution speed conditions from the first controller.

8. A lock-up control apparatus for a torque converter of a vehicular automatic power transmission associated with a prime mover which is driven in a plurality of driving modes such that output torque values thereof are different depending upon the driving modes under the same load conditions as claimed in claim 4, wherein the driving condition detector further comprises an engine coolant temperature sensor installed in the engine and connected to the first controller for detecting an engine coolant temperature and wherein the second controller determines that the engine is driven in the lean burn inhibit driving mode according to a signal indicating the information that the detected engine coolant temperature sensor is below a predetermined low temperature threshold value from the first controller and according to a signal indicating the information that the detected engine coolant temperature is above a predetermined high temperature threshold value from the first controller.

9. A lock-up control apparatus for a torque converter of a vehicular automatic power transmission associated with a prime mover which is driven in a plurality of driving modes such that output torque values thereof are different depending upon the driving modes under the same load conditions as claimed in claim 2, which further comprises a working oil temperature sensor installed in the automatic power transmission and connected to the second controller for detecting a working oil temperature of the automatic power transmission (T) and wherein the second controller determines whether the detected working oil temperature is equal to or above a predetermined high threshold value ($T_H$) or not and modifies the lock-up region to be moved toward the higher vehicle speed side when determining the detected working oil temperature is equal to or above the predetermined high threshold value.

10. A lock-up control apparatus for a torque converter of a vehicular automatic power transmission associated with a prime mover which is driven in a plurality of driving modes such that output torque values thereof are different depending upon the driving modes under the same load conditions as claimed in claim 9, wherein the second controller determines that the engine is driven in the lean burn inhibit driving mode according to an absence of the signal indicating the information that the engine is driven in the lean burn driving mode from the first controller and thereafter the first controller determines whether the detected working oil temperature (T) is equal to or above the predetermined high threshold value ($T_H$).

11. A lock-up control apparatus for a torque converter of a vehicular automatic power transmission associated with a prime mover which is driven in a plurality of driving modes such that output torque values thereof are different depending upon the driving modes under the same load conditions as claimed in claim 10, wherein the lock-up device comprises a lock-up clutch piston and a lock up clutch solenoid which is turned to ON so as to make the direct coupling between the input and output elements of the torque converter via the lock-up clutch piston.

12. A lock-up control apparatus for a torque converter of a vehicular automatic power transmission associated with a prime mover which is driven in a plurality of driving modes such that output torque values thereof are different depending upon the driving modes under the same load conditions, the torque converter having a lock-up device which is so constructed and located in the torque converter as to operatively lock up input and output elements of the torque converter to make a direct coupling therebetween, the lock-up control apparatus comprising:

a driving condition detector which is so constructed and located in the prime mover as to detect a driving condition of the prime mover, the driving condition detector having a load sensor which is so constructed and located in the prime mover as to detect a load imposed on the prime mover;

a vehicle speed sensor which is so constructed and located in the vehicle as to detect a vehicle speed;

a first controller which is so constructed and connected to the prime mover so as to provide which one of the plurality of driving modes the prime mover is to be driven for the prime mover on the basis of the driving condition of the prime mover; and     a second controller having a map defining a lock-up region with respect to the load and vehicle speed and which is so constructed and connected to the first controller and the automatic power transmission as to determine in which one of the plurality of the driving modes the prime mover is currently driven on the basis of an information that in which one of the plurality of the driving modes the prime mover is currently driven from the first controller and so as to operate the lock-up device to make the direct coupling between the input and output elements of the torque converter according to whether the detected load and the detected vehicle speed fall in the lock-up region of the map, the second controller modifying the lock-up region of the map to be moved toward a higher vehicle speed side when determining that the engine is driven in one of the driving modes in which the output torque value of the prime mover is higher than that in the case of the prime mover being driven in any one of the other driving modes.

13. A lock-up control method for a torque converter of a vehicular automatic power transmission associated with a prime mover which is driven in a plurality of driving modes such that output torque values thereof are different depending upon the driving modes under the same load conditions, the torque converter having a lock-up device which is so constructed and located in the torque converter as to operatively lock up input and output elements of the torque converter to make a direct coupling therebetween, the lock-up control method comprising the steps of:

a) detecting a driving condition of the prime mover including a load imposed on the prime mover;

b) detecting a vehicle speed;

c) providing which one of the plurality of driving modes the prime mover is to be driven for the prime mover on the basis of the driving condition of the prime mover detected at the step a);

d) determining in which one of the plurality of the driving modes the prime mover is currently driven on the basis of an information that in which one of the plurality of the driving modes the prime mover is currently driven at the step c);

e) extending a lock-up region of a map up to a higher load region when determining that the prime mover is currently driven in one of the plurality of driving modes in which the output torque of the prime mover is smaller than that in the case of the prime mover being driven in any one of the other driving modes;.

f) modifying the lock-up region of the map to be moved toward a higher vehicle speed side when determining that the engine is driven in another of the driving modes in which the output torque value of the prime mover is higher than that in the case of the prime mover being driven in any one of the other driving modes;

g) determining whether the detected load and vehicle speed fall in the lock-up region of the map; and     h) operating the lock-up device to make the direct coupling between the input and output elements of the torque converter when the detected load and the detected vehicle speed fall in the lock-up region of the map.

\* \* \* \* \*